United States Patent [19]

Okamoto

[11] 4,451,618
[45] May 29, 1984

[54] BLOCK COPOLYMERS AND PROCESS FOR THEIR PREPARATION

[75] Inventor: Yoshihisa Okamoto, Sagamore Hills, Ohio

[73] Assignee: The B. F. Goodrich Company, Akron, Ohio

[21] Appl. No.: 427,370

[22] Filed: Sep. 29, 1982

[51] Int. Cl.$^3$ .................. C08F 297/00; C08G 65/12
[52] U.S. Cl. .................................... 525/349; 525/379; 525/380; 525/385; 525/409; 525/410
[58] Field of Search .................. 525/286, 385, , 378, 525/379, 409, 404, 410, 349, 380; 528/409

[56] References Cited

U.S. PATENT DOCUMENTS

| | | | |
|---|---|---|---|
| 3,754,053 | 8/1973 | Kray et al. | 525/409 |
| 3,850,856 | 11/1974 | Dreyfoss | 528/85 |
| 3,864,288 | 2/1975 | Riew et al. | 525/409 |
| 4,200,733 | 4/1980 | Perner et al. | 525/409 |
| 4,256,910 | 3/1981 | Asu | 528/409 |

*Primary Examiner*—Allan Lieberman
*Attorney, Agent, or Firm*—Alfred D. Lobo; Nestor W. Shust; Alan A. Csontos

[57] ABSTRACT

Under particular conditions, a cationic ring-opening polymerization of an (single) oxirane monomer selected from the group consisting of an acyclic glycidyl ether, a cyclic glycidyl ether, and a haloalkyl epoxide, in the presence of a hydroxyl-terminated prepolymer ("HTP") and a particular catalyst, produces a polymerization having 'living polymerization' characteristics, provided the OH groups are aliphatic OH groups and not aromatic OH groups. The result is an AB or ABA type block copolymer the molecular weight (mol wt) of which is directly proportional to the conversion of the monomer to the block copolymer. The HTP which may be a mono-, di-, tri-, or tetra-hydroxyl-terminated prepolymer, serves as a chain propagator which initially furnishes OH groups as propagation sites. Linear block copolymers or branched block copolymers are formed, depending upon the structure of the HTP. Where one segment of an AB or ABA type block contains halogen, the segment may be aminated. If the other segment is hydrophobic, the aminated block copolymer is amphiphilic.

18 Claims, No Drawings

BLOCK COPOLYMERS AND PROCESS FOR THEIR PREPARATION

BACKGROUND OF THE INVENTION

Advances in the art of preparing block copolymers (from two or more monomers) with clearly defined block lengths and narrowly defined controlled molecular weight (mol wt), substantially free from homopolymer residues, has provided the bases for a host of commercially significant polymers prepared by anionic polymerization. Such advances in the art of preparing block copolymers, it is generally acknowledged, are not known in the art of cationic ring-opening polymerization. With respect even to the general art of cationic polymerization, Prof. Joseph Kennedy said "Cationic polymerizations have only very recently emerged from the dark middle ages and reached the point where synthetic tailoring of polymer structures became possible." (see Isotopics, pg 4, May 1982).

Specifically with respect to the cationic polymerization of ethylene oxide with $SnCl_4$, Worsfold and Eastham found that each $SnCl_4$ molecule rapidly initiates two polymer chains which slowly increase in length through stepwise addition of monomer. They observed that addition of monomer does not regenerate the reaction, and assumed termination to involve no transfer but rather destruction of the catalyst. See *High Polymers*, Vol. XIII, Part I, Polyalkylene Oxides and Other Polyethers, by Norman G. Gaylord, pg 113-114, Interscience Publishers, John Wiley & Sons, New York (1963). Thus, it would appear that there was a specific suggestion that block copolymers would not be formed by a living polymerization reaction with an acid catalyst or initiator, if the monomer had an ethylene oxide structure. By "living polymerization" I refer to one which is, for all practical purposes, free from transfer and termination reactions.

To one skilled in the art, the synthesis of polymers by cationic ring-opening polymerization and an assessment of the properties of block copolymers based on their structure, is bedded in theoretical considerations, which have been formulated with less conviction than those related to non-ring-opening cationic polymerizations, generally. An assessment of the probability that a little-understood process will provide a block copolymer with any particular structure and desirable properties such as stability, controllable block lengths and mol wt distributions, is even more theory-oriented, if not speculative.

Such theoretical considerations as the effect or reactivity ratios of monomers from which individual blocks of a particular block copolymer are formed, even if these ratios are determined in an analogous cationic polymerization system, is of no known relevance either with respect to the ease of formation of the particular block copolymers of my invention, or the particularity of their properties as a result of being derived by a specific cationic ring-opening polymerization.

The difficulty of tailoring block copolymers by cationic ring-opening polymerization so as to provide a mol wt within a narrow range and well-defined functionality is well known. Recently, novel block and graft copolymers based on the di- and multicationically ended living polyacetals and polyethers have been shown to be formed without a hydroxyl-containing material, and under anhydrous conditions. See *Cationic Ring-Opening Polymerization*, by Stanislaw Penczek, Polish Academy of Sciences, Center of Molecular and Macromolecular Studies, 90-362 Lodz, Poland; see *Makromol. Chem., Suppl.*, 3, 17-39 (1979). This work appears to confirm the teachings of the Dreyfuss U.S. Pat. No. 3,850,856 that OH groups would 'kill' the system, if it was a living one.

In view of the foregoing teachings, one unacquainted with the theory is more likely to consider the results of certain steps in a polymerization process quite easily accounted for, at least after the fact, than one who is more closely acquainted with the theory. Further, one skilled in the art would expect that properties of block copolymers will be different from those of random copolymers, but the difference in properties between certain block copolymers which superficially appear to be similar, may have a wholly different significance from differences in apparently similar random copolymers.

This invention is particularly directed to a process for making certain linear block copolymers using a hydroxyl-terminated prepolymer (hereinafter "HTP", for brevity) as the chain propagator which furnishes terminal OH groups as chain propagation sites; and, using preselected HTPs, for making AB or ABA type linear block copolymers; and, which process, relies upon a living polymerization generated by the catalytic action of a fluorinated acid catalyst having the formula $HMF_6$ wherein M is selected from phosphorus, arsenic and antimony; or, an oxonium salt of the acid. The process of my invention yields block copolymers which persons skilled in the art were unable to make with the teachings of the prior art, or believed they could not make, before the discovery of my process.

More specifically, the block copolymers of my invention are made by a living cationic ring-opening polymerization, and propagated at sites furnished by the HTP in the presence of a known catalyst disclosed in U.S. Pat. No. 3,585,227, and in U.S. Pat. No. 3,850,856, the disclosures of which are incorporated by reference herein as if fully set forth. The polymerization disclosed in the U.S. Pat. No. 3,850,856 patent was based on water, or ethylene glycol terminating the growing polymer chains by introducing OH groups at the terminal positions. This polymerization has now been discovered to be a living polymerization which is quite surprising since it is well known that "The nature of the processes involved in cationic copolymerisations of monomer mixtures, and the experimental limitations which they impose, have made this synthetic route to block copolymers generally unsatisfactory, at least for most comonomer pairs." (see *Block Copolymers*, by Allport, D. C. and Janes, W. H., pg 354, John Wiley & Sons, 1973). Implicitly, this corroborates a prejudice against cationic living polymerization systems.

Further, since known polymers such as those described in the U.S. Pat. No. 3,850,856 patent are clearly stated to be hydroxyl-ended, because of the use of water or glycol, there was no motivation to explore the possibility that, a hydroxyl-ended prepolymer might function as a chain propagator in the same manner as water or a glycol. Nor was it then realized that the choice of propagator (having OH propagating groups), and particularly whether the propagator is water or a glycol, would result in block copolymers having different structures.

Nevertheless, it has now been found that, under certain conditions, growth of block copolymers is propagated with a HTP, which growth occurs in a well-definable living polymerization system. More particularly, it now appears that the structure of the residue of the HTP chain propagator, whatever its length, does not adversely affect the growth of a block copolymer, but generates a living system able to grow preselected blocks, so that the overall polymer weight, the polymer segmental weight, and the polymer's functionality are each narrowly defined.

Epihalohydrin polymers formed by cationic polymerization with triethyloxonium hexafluorophosphate (TEOP) are known to be formed as disclosed in U.S. Pat. No. 3,850,857. However, neither the molecular weight of the polymers nor their functionality can be narrowly controlled, resulting in the loss of control of the polymers' properties. In contrast, the unexpectedly close control of molecular weight and functionality of the block copolymers of my invention facilitates the production of a variety of tailored block copolymers which are not only useful as film-formers, viscosity increasing agents, dispersing agents for polymerization, and the like, but also for mineral beneficiation where highly specific properties are essential to the making of sharp, and hence profitable, separations.

Such close control of mol wt and functionality is only possible because of the unique characteristics of a living polymerization found to be the key to the process, in which the mol wt of the polymer is increased directly with the amount of monomer converted to polymer.

Some two decades ago, it was known that hydroxyl group-containing compounds are condensed with epoxyalkyl halides in the presence of fluoboric catalysts as disclosed in U.S. Pat. No. 3,129,232. Soon thereafter it was shown in U.S. Pat. No. 3,305,565 that water is an initiator in the presence of various acid catalysts forming halo-hydroxyl terminated polymers which could be epoxidized. More recently, terminally unsaturated liquid epihalohydrin polymers have been disclosed in U.S. Pat. No. 4,256,910 which are relatively low in molecular weight, in which polymers a backbone is obtained by homopolymerizing an epihalohydrin, or forming random copolymers by copolymerizing two or more epihalohydrins, or copolymerizing an epihalohydrin with a vicinal epoxide, and using the same TEOP catalyst as used in the U.S. Pat. No. 3,850,856 process. However, there is neither any indication that the hydroxyalkyl (meth)acrylate used in the U.S. Pat. No. 4,256,910 patent functioned as a chain propagator, nor that the mol wt and functionality of the polymer were narrowly defined.

U.K. Patent Application No. 2,021,606A teaches that hydroxyl-terminated poly(chloroalkylene ethers) have not proven entirely satisfactory when prepared by cationic ring-opening polymerization as disclosed in U.S. Pat. Nos. 3,850,856; 3,910,878; 3,910,879; and, 3,980,579. Thus, the problems inherent in the use of prior art catalysts referred to in the foregoing U.S. patents have been documented. A solution to the problems was provided in the British patent application. This solution was to use a catalyst comprising (i) a fluorinated acid catalyst having the formula $H_mXF_{n+m}$ wherein X is selected from boron, phosphorus, arsenic and antimony, m is 0 or 1 and n is 3 when X is boron and n is 5 when X is phosphorus, arsenic and antimony, and, (ii) a polyvalent tin compound.

This British patent teaches that only tin fluorometallic compounds even among other Group IV metals, has a peculiar catalytic action not attributable to Group V fluorometallic compounds. The British catalyst permits water to provide hydroxyl-terminated polymers with the same structure as those polymers provided by other hydroxyl-containing materials (HCM). Among such HCMs are disclosed polyoxyethylene and polyoxypropylene glycols and triols of molecular weights from 200 to about 2000, hydroxyl (OH)-terminated polyalkadienes, and polytetramethylene glycols of varying molecular weight.

My experiments with OH-terminated poly(ethylene ether) and poly(propylene ether) which I will detail hereinafter, failed to yield block copolymers with epichlorohydrin despite my having continued the polymerization reaction for more than 80 hr. Only when the equilibrium of the reaction was heavily biased, deliberately, was there any formation of block copolymer.

This finding was consistent with the well known fact that triethyloxonium tetrafluoroborate degrades poly(ethylene ether) glycol to dioxane, and apparently, dioxane formation via oxonium salts is more favored than propagation (see *Advances in Polymer Science*, Vol. 23, pg 104, by E. J. Goethals, published by Springer-Verlag, Berlin Heidelberg New York, 1977). Further, irrespective of the mol wt of a series of polyglycols, with sufficient oxonium salt, the polymers were completely degraded and the only reaction product was dioxane which is a stable 6-membered ring. The effectiveness of the oxonium salt in decomposing the polymer increases with increasing mol wt until an apparent maximum is reached at a mol wt of 6000. This suggests that the formation of dioxane from the polymer is a chain reaction that is stopped by two different termination reactions: a first one occurs with OH groups terminating it, and a second one occurs when an average of 40 molecules of dioxane have been formed per molecule of initiator. Each termination reaction clearly precludes the OH group from being a propagating site.

With respect to a poly(alkylene ether) such as OH-terminated poly(tetramethylene ether) (polytetrahydrofuran "PTHF"), one would also expect it to behave in a manner analogous to its lower homologs. In particular, PTHF is known to undergo degradation with a simple 'back-biting' reaction (see E. J. Goethals text supra, pg 128) which results in its depolymerization forming a stable 5-membered ring. The details of the reaction are well known (see *Advances in Polymer Science*, Vol 37, by Penczek et al, in the chapter titled "Cationic Ring-Opening Polymerization of Heterocyclic Monomers", pg 97, 1980).

There was no reason for me to believe that OH-terminated PTHF would behave differently from OH-terminated poly(ethylene ether) (PEO) and poly(propylene ether) (PPO). Yet I have found that it (PTHF) does.

Since a polyalkadiene diol is a OH-terminated polymer, like OH-terminated PEO, PPO and PTHF, though not structurally analogous, the focal points with respect to the propagation of each of the polymers in a block copolymerization is their terminal OH groups, all of which are the same. Since these terminal OH groups fail to provide block copolymers in each of the foregoing instances with PEO, or PPO and would not be expected to form a block copolymer with PTHF, it was readily accepted that polyalkadiene diols would behave in an analogous manner.

Experimental evidence presented hereinafter showed that polybutadiene diol (PBD diol) made by ethoxylation of carboxy-terminated butadiene as disclosed in U.S. Pat. Nos. 3,551,471 and 3,712,916 fails to provide any copolymer. Further, a OH-terminated copolymer of butadiene-acrylonitrile also failed to give a block copolymer. Still further, a commercially available OH-terminated PBD (Lithene[R] HFN4-5000 obtained from Revertex Ltd) yielded a mixture of copolymers with an ill-defined multinodal distribution (GPC) analysis). Thus it was concluded that OH-terminated PBD behaved in a manner analogous to the other OH-terminated polymers.

Amphiphilic block copolymers have been found especially useful in water treatment processes, and as the main constituent of nonaqueous lyotropic liquid crystals. A lyotropic liquid crystal, by definition, consists essentially of an amphiphilic compound and a solvent. The latter modifies the structure of the amphiphile from solid or liquid to liquid crystalline by changing the environment around the polar part of the amphiphile. Numerous examples of such lyotropic mesoaggregates with biological importance have been reported in which the solvent may be water or an organic hydroxy compound. Among these organic compounds found to give nonaqueous liquid crystals were different chain length alkanediols, low molecular weight polyethylene glycols, different cellosolves and some amines. (see "Nonaqueous Lyotropic Liquid Crystals from Lecithin and Nonionic Surfactants" by Li Ganzuo et al. in *Mol. Cryst. Liq. Cryst.* Vol 72 (Letters), pp 183–188).

More recently, two-headed, single-chain amphiphiles have been disclosed which produce huge aggregates in dilute aqueous solutions. A flexible decaethylene unit and a rigid diphenylazomethine or biphenyl unit were found to produce aggregates with a rod-like structure so as to form a monolayer or bilayer membrane. (see *J. Am. Chem. Soc.* 101, 5231, 1979).

This intrinsic property of lyotropic mesomorphism exhibited by block copolymers with amphiphilic properties, results in the formation of a thermodynamically stable liquid crystalline system through the penetration of a solvent between the molecules of a crystal lattice. These lyotropic mesoaggregates usually form ordered lattices in one or two directions which cause characteristic anisotropy. See *Lyotropic Liquid Crystals and the Structure of Biomembranes,* edited by Stig Friberg, in a chapter titled "Lyotropic Mesomorphism—Phase Equilibria and Relation to Micellar Systems", by Ingvar Danielsson, Advances in Chemistry Series 152, published by A.C.S. 1976. This property has been used to synthesize stable, model membranes which can be used to study biological processes, particularly those characterized by a lipid bilayer membrane.

Thus, it was expected that this layered structure in which the molecules are so tightly packed as to form an anisotropic mesoaggregate or liquid crystalline structure, would result from the amination of the block copolymers of this invention. If such a structure did in fact result, it was evident that further amination of the molecules would be obstructed, except for portions of those molecules near the surface of the huge aggregates expected to be formed. It is not. Quite surprisingly, the block copolymers of this invention may be aminated essentially completely, if so desired, thus forcing the conclusion that the structure of the aminated block copolymers of this invention, whether on a submicroscopic or macroscopic scale, is quite distinct from the prior art aminated block copolymers.

SUMMARY OF THE INVENTION

It has unexpectedly been found that, under particular conditions, a cationic ring-opening polymerization of an oxirane monomer selected from the group consisting of an acyclic glycidyl ether, a cyclic glycidyl ether, and a haloalkyl epoxide, in the presence of a hydroxyl-terminated prepolymer ("HTP") and a particular catalyst, produces a polymerization having 'living polymerization' characteristics, provided the the OH groups are aliphatic OH groups and not aromatic OH groups. The result is an AB or ABA type block copolymer the molecular weight (mol wt) of which is directly proportional to the conversion of the monomer to the block copolymer. The HTP (termed a 'prepolymer' for clarity and to identify this polymer separately from the block copolymer formed) serves as a chain propagator which initially furnishes OH groups as propagation sites.

It is therefore a general object of this invention to provide linear AB or ABA type block copolymers, or branched AB type (B represents the HTP) block copolymers, such that the mol wt of the block copolymer may be controlled by adjusting the ratio of oxirane monomer to HTP.

Essential requirements of this cationic ring-opening living polymerization of one of the aforespecified oxirane monomers have been found to be the use of (i) a catalytic amount of a catalyst (initiator) which may be either a fluorinated metallic acid catalyst having the formula $HMF_6$ wherein M is selected from phosphorus, arsenic and antimony; or, an oxonium salt of the acid; and, (ii) a HTP chain propagator which is at least partially soluble, and more preferably, is completely soluble in the reaction mass, with or without a solvent.

It is therefore a general object of this invention to provide a process for the manufacture of a block copolymer of a HTP and an oxirane monomer, which process comprises, (i) polymerizing, a HTP with an oxirane monomer selected from the group consisting of an acyclic glycidyl ether, a cyclic glycidyl ether, and a haloalkyl epoxide, in the presence of a catalytic amount of a catalyst selected from the group consisting of an $HMF_6$ acid, and, an oxonium salt of the $HMF_6$ acid, wherein M is an element selected from the group consisting of phosphorus, arsenic and antimony, and, (ii) recovering said block copolymer which is formed in an amount directly proportional to the conversion of monomer.

It is another general object of this invention to provide novel block copolymers prepared by a process which comprises polymerizing (A) a single ring-openable oxirane monomer selected from the group consisting of (i) an aliphatic or aromatic glycidyl ether having the structure

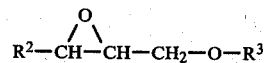
(I)

wherein $R^2$ and $R^3$ is each independently selected from the group consisting of hydrogen, or a substituted group such as a hydrocarbon group, i.e. alkyl or substituted alkyl, particularly haloalkyl, alkenyl or substituted alkenyl, particularly haloalkenyl, alkoxyalkyl, aryl (Ar) or substituted aryl (Ar-Q), particularly wherein Q is selected from the group consisting of alkyl, haloalkyl each having from 1 to about 10 carbon atoms, alkenyl and haloalkenyl each having from 2 to about 10 carbon atoms; and, (ii) a haloalkyl epoxide having the structure

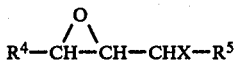 (II)

wherein X is a halogen atom and $R^4$ and $R^5$ is each independently selected from the group consisting of hydrogen and alkyl having from 1 to about 4 carbon atoms, with (B) a HTP, in the presence of a catalytic amount of a catalyst selected from the group consisting of a hexafluoro acid having the formula $HMF_6$ wherein M is a Group V element selected from phosphorus, arsenic and antimony, and oxonium salts of said hexafluoro acid, to yield a block copolymer having the structure

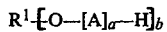 (III)

wherein, $R^1$ represents the residue of said HTP which originally contains from 1 to about 4 terminal hydroxyl groups;

A represents the residue of said oxirane monomer; so that the molecular weight of the resulting block copolymer is directly proportional to the amount of monomer converted; and, a represents an integer in the range from about 5 to about 100;

b represents an integer in the range from 1 to about 4; so that the molecular weight of each of the segments of the copolymer is in the range from about 350 to about 100,000, and the molecular weight of the block copolymer is in the range from about 500 to about 500,000.

It is a specific object of this invention to provide linear block and branched block copolymers of (i) a HTP having from 1 to about 4 terminal hydroxyl groups, with either a glycidyl ether having the foregoing structure (I), or an epihaloalkylene ether, in the presence of a catalytic amount of the $HMF_6$ acid, or the oxonium salt of the $HMF_6$ acid, preferably a trialkyl oxonium salt.

It has further been discovered that the choice of the HTP chain propagator is wholly determinative of the structure of a block copolymer formed by a living cationic ring-opening polymerization of a ring-openable oxirane monomer in the presence of the HTP, under conditions favorable to the polymerization. Such conditions are mild, namely, ambient pressure and a temperature in the range from about 0° C. to about 100° C., generally in a bulk or mass polymerization system, though a solvent may be used to facilitate interaction of the reactants.

It is therefore also a general object of this invention to provide block copolymers of the AB or ABA type, wherein A represents a block of an oxirane monomer, and B represents the HTP block, and the oxirane monomer is either a glycidyl ether or a haloalkyl epoxide. A branched block copolymer will result if the HTP has plural terminal OH propagating sites as for example when the HTP is tri-hydroxyl-terminated epichlorohydrin.

It has still further been discovered that a block copolymer of a glycidyl ether and a haloalkyl epoxide, or a block copolymer of a polyalkadiene diol and a haloalkyl epoxide, or a block copolymer of a polyalkadiene diol and a halogenated glycidyl ether, any of which block copolymers is formed by propagation with a HTP, may be aminated (quaternized) under elevated temperature and pressure, despite the presence of a segment in the block copolymer which is not aminatable. Such amination has been found to occur even when the non-aminatable segment constitutes a major proportion by weight of the block copolymer. The amination of a halo-substituted segment of the block copolymer may be carried out to any desired extent despite any aggregative packing of molecules which may occur.

DETAILED DESCRIPTION OF PREFERRED EMBODIMENTS

The cationic ring-opening living polymerization disclosed herein occurs because of the specific catalyst used with an organic hydroxyl-terminated prepolymer ("HTP") which acts as a chain propagator for a ring-openable oxirane monomer. This polymerization reaction was not known to produce block copolymers having the structure (III) in which the HTP is a mono-, di-, tri-, or tetra-hydroxyl (aliphatic OH)-terminated polymer having a mol wt in the range from about 350 to about 15,000 or even higher.

The structure (III) of the block copolymer formed, is determined by the structure of the HTP chosen and the number of its propagating sites (OH groups), and the particular monomer to be reacted therewith, provided the HTP and oxirane monomer are relatively soluble in a co-solvent, or the HTP is soluble in the oxirane monomer, or vice versa.

If the HTP and oxirane monomer are not mutually soluble there will be no block polymerization; the higher the solubility, generally the better the polymerization reaction. Where for example, a OH-terminated polyalkadiene is the HTP to which polyepichlorohydrin is to be blocked, a co-solvent is essential. However, when PTHF is the HTP, a mass polymerization is easily realized with any of a large number of oxirane monomers including a haloalkyl epoxide.

In the preferred embodiment of the invention, the block copolymer (III) is formed by the action of a hexafluorometallic (Group V) acid catalyst, or oxonium salt thereof, in the presence of the soluble HCM brought into contact with either (i) a ring-openable glycidyl ether having the structure (I) written hereinabove, or (ii) a haloalkyl epoxide, under mild reaction conditions, namely a temperature in the range from about 0° C. to about 150° C., and more preferably from about 25° C. to about 80° C., at ambient or slightly elevated pressure.

The catalyst is selected from a hexafluorometallic (Group V) acid, $HMF_6$ wherein M is an element selected from the group consisting of phosphorus, arsenic and antimony, such acids being $HPF_6$, $HAsF_6$, and $HSbF_6$; and, an oxonium salt of said acid. The catalyst is used in an amount sufficient to initiate the polymerization. It is preferred to use a cyclic or acyclic oxonium salt which may be primary, secondary or tertiary. The cyclic oxonium salt may be prepared by reaction of an acyclic oxonium salt with tetrahydrofuran. It is most preferred to use a trialkyloxonium or other oxonium salt of the $HMF_6$ acid prepared as described in U.S. Pat. No. 3,585,227. The amount of the catalyst used is not critical, from about 0.001 part to about 1 part per 100 parts by wt of oxirane reactants, and more preferably from about 0.01 to about 0.1 part, being generally sufficient. It is desirable, both for economic reasons and for control of the reaction, to keep the amount of catalyst used as low as possible.

As stated hereinabove, the number of the terminal hydroxyl groups on the HTP will determine the structure of the resulting HTP-alkylene oxide block copolymer. In addition, the amount of the HTP used in the polymerization is critical since it determines the mol wt of the resulting HTP-alkylene oxide block copolymer. When a preselected amount of the HTP of chosen structure is employed, it functions as a chain propagator, the OH groups serving as propagating sites, and the growth of polymer continues until all the monomer is consumed.

The theoretical mol wt of the HTP-alkylene oxide block copolymer is calculated by the following equation:

$$Mn = ([\text{monomer}]/[\text{HTP}] \times \text{mol wt of monomer}) \times (\%\text{conv}/100) + \text{mol wt of HTP}$$

For example, polymerization of 100 g of poly(tetramethylene ether) glycol (PTHF) having a mol wt of 1000, and 925 g of epichlorohydrin (ECH) produces a block copolymer with a mol wt of 10250 at 100% conversion. Since this block copolymer possesses two terminal hydroxyl groups, it has a theoretical hydroxyl equivalent weight (HEW) of 5125. Since the hydroxyl number is (56100/HEW), it (the OH No.) computes to be 10.9.

The benefit of the peculiar catalytic function of the $HMF_6$ acid, or oxonium salt thereof, is obtained with any soluble HTP having the structure $R^1(OH)_n$ wherein n represents an integer in the range from 1 to about 4. The HTP is necessarily free from any other group, that is other than OH, which other group may react in the presence of the catalyst used herein. The HTP may be a straight chain or branched polymer having aliphatic, cycloaliphatic, or other hydrocarbyl repeating units including those having ethylenic unsaturation or aromatic repeating units, provided the HTP carries at least one and generally not more than about four (4) terminal aliphatic OH propagating sites. When more than 4 terminal OH groups are present, propagation of an AB type block copolymer becomes hindered for steric reasons.

$R^1(OH)_n$ preferably represents a OH-terminated polymer, and $R^1$ the residue of the polymer which is selected from the group consisting of a poly(alkylene ether) having at least 4 carbon atoms in a repeating unit, a polyalkane, a polyalkadiene in which the repeating unit has from 4 to about 5 carbon atoms, and a copolymer of said alkadiene with a vinyl aromatic monomer having from 8 to about 10 carbon atoms.

More commonly available HTPs are mono- and dihydroxyl terminated polybutadiene and polypentadiene having a mol wt in the range from about 500 to about 15,000; poly(tetramethylene ether) glycol and poly(pentamethylene ether) glycol having a mol wt in the range from about 500 to about 10,000; OH-terminated poly(glycidyl ether) having the structure (I) having a mol wt in the range from about 500 to about 12,000 wherein the repeating unit is selected from the group consisting of an alkyl glycidyl ether having from 4 to about 12 carbon atoms, including methyl glycidyl ether, butyl glycidyl ether, phenyl glycidyl ether, and the like; an alkenyl or substituted alkenyl glycidyl ether having from 5 to about 12 carbon atoms, including vinyl glycidyl ether, allyl glycidyl ether, butenylglycidyl ether, 4-vinylcyclohexyl glycidyl ether, abietyl glycidyl ether, cyclohexenylmethyl glycidyl ether, o-allylphenyl glycidyl ether, and the like; OH-terminated poly(haloalkylene ether) having the structure (II) having a mol wt in the range from about 500 to about 10,000 wherein the repeating unit is selected from the group consisting of 1-chloro-2,3-epoxypropane (epichlorohydrin); 1-bromo-2,3-epoxypropane (epibromohydrin); 1-chloro-2,3-epoxybutane; 1-iodo-2,3-epoxyhexane; 3-chloro-4,5-epoxyoctane; 1-chloro-2,3-epoxycyclohexane; 1-bromo-2,3-epoxy-3-methylbutane; 2-chloro-2-methyl-3,4-epoxypentane; and the like, having from 3 to about 8 carbon atoms per repeating unit. The most preferred HTPs are those having a residue of polybutadiene, polyalkane, PTHF, PECH, poly(allyl glycidyl ether), poly(phenyl glycidyl ether) and poly(butadiene-co-styrene).

The temperature employed in the polymerization process of the present invention is usually between about 0° C. and 110° C. However, it is preferred to employ temperatures in the range from about 25° C. to about 80° C., since at these temperatures desirable polymerization rates are obtained without decomposition of the catalyst. It may be desirable, in many cases, to preheat or precool the contents of the reactor to the desired reaction temperature prior to the addition thereto of the catalyst or initiator.

The polymerization reaction is exothermic. However, the reaction temperature is readily maintained by the controlled rate of catalyst addition, and suitable heat exchange means. The time of the polymerization reaction will normally vary from about 1 to about 10 hours and in many cases, will take up to about 24 hours or more, depending upon the particular catalyst used, the amount used, the temperature, and other factors.

The progress of the reaction may be monitored by periodic sampling to determine the amount of monomer converted. On completion of the polymerization, the reaction is terminated by neutralizing the catalyst, generally by adding a slight molar excess of a base such as ammonium hydroxide in an alcoholic (isopropanol) solution. Unreacted monomer, if there is any, may be removed by evaporation under vacuum.

The polymers formed by the process described herein can be of higher mol wt that is, higher than the mol wts heretofore normally obtainable by prior methods for the cationic polymerization of epihalohydrins, as taught for example in the Dreyfuss U.S. Pat. No. 3,850,856 patent. The polymers will vary from liquids, to semisolids, to solids, and the weight average (wt avg) mol wt of such polymers will vary from about 500 to about 500,000.

Molecular weights are preferably determined by gel permeation chromatography (GPC) using a Waters Model 200 instrument equipped with a modified Waters R4 differential refractometer detector. The solvent used is THF and flow rate is 2.0 $mm^3$/min, in a column 25 cm×7.8 mm ID, packed with Waters Microstyragel.

The mol wt of block copolymers may also be obtained by determining the OH No. and calculating the number avg mol wt as described in *Preparative Methods of Polymer Chemistry*, Sorenson, W. R. and Campbell, T. W., pg 155, Interscience Publishers, 2nd ed. (1968).

The polymerization process, described herein, may be carried out at autogenous pressures although superatmospheric pressures of up to 10 atmospheres or more may be employed with some advantage with the more volatile monomers. Superatmospheric pressures may also be employed with those monomers and/or solvents having the requisite volatilities at reaction temperatures permitting reflux cooling of the reaction mixture.

The unexpected results of the instant invention are formation of block copolymers having (i) designed (desired) mol wt, (ii) designed structure, as a result of the positioning of preselected propagating sites, and (iii) precise functionality, which block copolymers are produced with (iv) excellent control of the temperature of polymerization, (v) high yield, and (vi) high catalyst efficiency. By 'catalyst efficiency' is meant the weight of polymer produced per unit weight of catalyst (initiator) employed. For example, a yield of about 1 kg of polymer to about 10 kg of polymer per (one) gram of catalyst used is obtained by use of the present invention. Such high yields are comparable only to those obtained by the Dreyfuss process mentioned hereinabove. Moreover, because the mol wt and functionality are controlled, the viscosity of the polymer is controlled.

As might be expected, the rate at which each oxirane monomer is polymerized will depend upon its structure, other conditions being the same. It has been found that the rate at which an aromatic glycidyl ether, such as phenyl or naphthyl glycidyl ether, is polymerized, is greater than that of an alkylene glycidyl ether such as allyl glycidyl ether, which in turn is greater than that of a haloalkyl epoxide such as epichlorohydrin. Thus, in the preparation of a block copolymer which is to be aminated, it is generally desirable to polymerize a halogenated glycidyl ether rather than a haloalkyl epoxide if speed of reaction is a primary consideration.

The quaternization ("amination") of polyepihalohydrins is known to yield highly water soluble products useful as coagulants, for example in the treatment of raw sewage, and the breaking of oil-in-water emulsions as disclosed in U.S. Pat. No. 3,591,520. However, as mentioned hereinbefore, the aminated block copolymers are known to have the property of lyotropic mesomorphism, and "lightly aminated" block copolymers, so termed when less than about 10 percent of halogen atoms on one segment, either the A segment or the B segment, are aminated (the other segment is non-aminatable), may be used for the preparation of lyotropic membranes and the like. "More aminated" block copolymers (so termed when more than about 10 percent of the halogen atoms the aminatable segment are aminated), are useful in water-treatment applications particularly as emulsifiers, and also useful as surfactants, sizing agents, anti-static agents ("anti-stats") and the like. Thus, when the block copolymer of my invention is PECH-b-PTHF-b-PECH the PECH segment may be conventionally aminated with an amine capable of an addition reaction with the PECH to yield an aminated block copolymer.

In the aminated block copolymer, each reactive halogen is typically replaced with $(N^+R_3^6.X^-)$alkylammonium halide wherein X represents halogen, usually Cl, Br or I, and $R^6$ is the residue of an amine, identified hereinbelow, used to aminate the block copolymer. If both the HTP and the oxirane monomer are halo-substituted, and the halogenated HTP and halogenated monomer are blocked together, at least some of the halogen substituents of each block of the block copolymer will be aminated.

If no portion of the aminated block copolymer is hydrophobic, it will be hydrophilic. Controlled amphiphilicity is most preferably attained by adjusting the length of the PECH block, that is, choosing 'a', and/or choosing the HTP which may have reactive halogen substituents intermediate its OH propagating sites. In addition, the length and structure of the HTP may be chosen, as may the overall mol wt of the polymer, that is, obtaining a predetermined 'b'.

Segments of PECH are the most preferred if block copolymers of this invention are to be aminated. Amination of the chloromethyl groups in PECH with a wide variety of aliphatic and aromatic amines is known to produce the corresponding ammonium salt which provides cationic charges and imparts hydrophilicity to the polymer. It is known that amination of PECH may be effected in such a manner as to convert the normally hydrophobic PECH to a hydrophilic polymer, but a polymer with amphiphilic properties, that is, having both hydrophilic and hydrophobic characteristics, is difficult to obtain. Controlled amphiphilic properties are of especial interest in the 'fabrication' of water-treatment chemicals. The block copolymers of this invention may be tailored so that the degree of hydrophilicity or amphiphilicity may be controlled by the structure of the block copolymer, the type of amine used to aminate it, and the number of chloromethyl groups which are actually aminated.

When PECH is the segment to be aminated, the aminated block copolymer has the structure

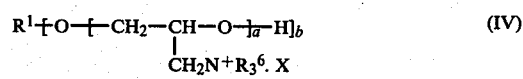
(IV)

wherein X represents a halogen, $R^1$ has the same connotation as for structure (III) hereinabove, $R^6$ is the residue of an amine used to aminate the block copolymer, and 'a' and 'b' represent numerals defined as for said structure (III).

Any conventionally used amine may be used for aminating PECH. Preferred amines are selected from the group consisting of: alkylamines, dialkylamines, and trialkylamines having from 1 to about 30 carbon atoms, and more preferably from 1 to about 6 carbon atoms; cyclic alkylamines having from 5 to about 7 carbon atoms, more preferably cyclohexylamine; fatty amines having from 10 to about 50 carbon atoms; polymeric amines and polyetheramines having a mol wt in the range from about 100 to about 500; alkanolamines having from 1 to about 30 carbon atoms, and more preferably from 1 to about 6 carbon atoms; morpholine; pyridine; aniline; thiazines; and silane-containing amines having from 5 to about 20 carbon atoms.

Preferred for amination are block copolymers with a multiplicity of reactive chlorine atoms so that at least 20 percent of all Cl atoms are aminated. When the residue is non-aminatable, and a segment of the block copolymer is aminatable, the aminated block copolymer will be amphophilic.

Amination is usually effected using a predetermined stoichiometric amount of the amine, or a slight excess over the amount calculated as being necessary to effect the desired degree of amination. A solvent, such as a lower alkyl cyanide such as acetonitrile, an aliphatic ketone having from 2 to about 20 carbon atoms, particularly acetone, or even water, may be used to obtain a homogeneous solution, though obtaining such a solution is not necessary. It is preferred for amination, to use block copolymers which do not require a solvent. The reaction is carried out in the range from about 40° C. to about 150° C., and autogenous pressure. It will be recognized that, when the amine is gaseous under the conditions of amination, the reaction is preferably carried out under elevated pressure in the range from about 50 psig to about 500 psig.

The block copolymers of this invention, optionally aminated, are particularly useful in chain extension reactions, the chain extending agent being any polyfunctional compound which will react, under appropriate conditions of temperature, pressure and suitable catalyst, with the hydroxyl groups. Such compounds can be polyisocyanates such as m- or p-phenylene diisocyanate, 2,4-toluene diisocyanate, etc., or polyepoxides such as Epon resins, as for example, the diglycidyl ether of Bisphenol A, and the like. The difunctional chain-extending agents are generally used in stoichiometric amounts to the reactive hydroxyl groups at the chain ends, when a linear, relatively high mol wt polymer is desired, such as may be soluble in commonly available solvents. When the chain-extending agent contains more than two functional groups, and the hydroxyl-ended polymer has two reactive hydroxyl groups, the polymer formed will be cross-linked.

The following examples serve to illustrate the invention. Where not otherwise stated, parts are given as parts by weight and the temperatures in degrees centigrade (°C.).

EXAMPLE I

HTP is hydroxyl-terminated poly(ethylene ether) with the repeating unit being $-\{CH_2-CH_2-O\}-$.

A. 50 g of epichlorohydrin (ECH) and 75 g of Carbowax ® OH-terminated poly(ethylene ether) glycol (PEO) are placed in a three-necked flask and 0.025 g of TEOP in 5 ml of methylene chloride gradually added to the flask which is held at 30° C. The PEO degrades and there is no indication that any of the ECH is polymerized though the reaction is carried out for more than 80 hr.

B. To shift the equilibrium with an excess of ECH, a second run is made in which 75 g of ECH and 25 g of PEO are placed in a three-necked flask and 0.070 g of TEOP in 5 ml of methylene chloride gradually added to the flask which is held at 30° C. The PEO degrades and there is no indication that any of the ECH is polymerized though the reaction is carried out for more than 24 hr.

C. To shift the equilibrium still further, a third run was made with 480 g of ECH and 73.3 g of PEO which were placed in a three-necked flask and 0.370 g of TEOP were added to the contents of the flask. The polymerization was carried out at 30° C. It was found that after 22 hr, 5% of the ECH had been polymerized; at the end of 100 hr, nearly 60% of the ECH was polymerized.

Analogous results were obtained with OH-terminated poly(propylene ether) (PPO), though the conversions were generally better than those obtained with PEO.

EXAMPLE II

HTP is OH-terminated polybutadiene (PBD):

A. 80 g of ECH and 40 g of Hycar ®RLP 2000×166 PBD diol commercially made by the B. F. Goodrich Company, and 0.06 g TEOP in 5 ml of methylene chloride were stirred at 30° C. for 22 hr. No polymerization occured.

B. 350 g of ECH and 350 g of Lithene HFN4-5000 OH-terminated PBD obtained from Revertex Ltd., and 0.38 g TEOP in 10 ml of methylene chloride are reacted at 30° C. for 8 hr. All the ECH monomer is polymerized. Analysis of the polymer by GPC analysis shows multinodal curves indicating an ill-defined polymeric structure unlike the mononodal distribution which is the 'fingerprint' of a block copolymer.

C. 350 g of ECH and 350 g of a OH-terminated copolymer of butadiene and acrylonitrile are placed in a flask with 0.38 g of TEOP and reacted at 30° C. for 48 hr. No formation of any polymer is indicated.

EXAMPLE III

HTP is OH-terminated poly(tetramethylene ether) (PTHF):

A. Preparation of block copolymer $[(ECH)_m\text{-}(PTHF)\text{-}(ECH)_n]$.

75 g of ECH and 25 g Teracol ®1000 polytetramethylene glycol (PTHF) obtained from DuPont Company are charged to a 250 ml three-necked flask fitted with a stirrer, a thermometer, and a septum, and the flask purged with nitrogen. To the above mixture was added 0.05 g TEOP in 5 ml of $CH_2Cl_2$ while maintaining the temperature at 30° C. The reaction was carried out overnight (about 12 hr) and the polymerization was terminated by adding 300 ml of ammonium hydroxide/isopropanol (one-fourth by vol). The reaction product was dried in vacuuo at about 70° C. for about an hour. The mol wt of the block copolymer obtained was calculated to be about 3900. The hydroxyl number found for the polymer is 29, the calculated OH No. is 28.

In the general structure above, 'm' and 'n' are integers, each generally nearly equal to the other, the sum of which is "a", that is, $m+n=a$, and 'a' is in the range from about 5 to about 100, as defined hereinbefore. The block copolymeric structure of the reaction product is evidenced by a mononodal distribution displayed by the GPC analysis.

B. In a manner analogous to that described immediately hereinabove, again using Teracol ®1000 and ECH, the block formed was [(ECH, 4500)-b-(PTHF, 1000)-b-(ECH, 4500)]. This block copolymer was aminated as follows:

Amination of [ECH-b-PTHF-b-ECH]:

100 g of this block copolymer formed was dissolved in water and 83 g of trimethylamine added in a pressurizable container. The temperature was maintained at about 100° C. for 8 hr. The aminated product was found to have about 18.6% Cl and about 78% is aminated.

C. In a manner analogous to that described immediately hereinabove, when Teracol ®2000 is used instead of the Teracol ®1000, a block copolymer was obtained with a calculated mol wt of about 8000, and found to have a OH No. of 16 (the calculated OH No. is 14).

D. Preparation of block copolymer $[(AGE)_m\text{-}(PTHF)\text{-}(AGE)_n]$.

In a manner analogous to that described immediately hereinabove, allyl glycidyl ether (AGE) is blocked to the PTHF (mol wt 1000) to obtain a block copolymer having the structure written immediately hereinabove and having a mol wt of 1800.

EXAMPLE IV

HTP is OH-terminated poly(epichlorohydrin) (PECH):

A. Preparation of block copolymer $[(PGE)_m\text{-}(PECH)\text{-}(PGE)_n]$.

In a manner analogous to that described hereinabove, the HTP is polyepichlorohydrin having a mol wt of about 800, to which is added monomeric phenyl glycidyl ether, again in a flask provided with a stirrer, thermometer and septum, and TEOP catalyst added slowly until all is added over a period of about two minutes. The reaction is carried out overnight at abut 30° C., after which the reaction product is found to be the block copolymer having the structure written, and it is formed with essentially complete conversion of the monomer (about 98% is converted).

B. Preparation of block copolymer [(BGE)$_m$-(PECH)-(BGE)$_n$].

In a manner analogous to that described hereinabove, monomeric butyl glycidyl ether (BGE) is essentially completely converted to the block copolymer for which the structure is written.

In a particular illustration, 35 g of OH-terminated PECH having a mol wt of about 1000, and 70 g of BGE are mixed in a flask equipped as before, and 0.0839 g of TEOP in 5 ml of methylene chloride added to the mixture. The reaction is carried out at about 30° C. for a period of about 6.5 hr at the end of which about 98% of the BGE is converted. The mol wt of each BGE segment is about 1000.

EXAMPLE V

HTP is OH-terminated polybutadiene (PBD):

A. Preparation of block copolymer [(PECH)-(PBD)-(PECH)].

In a manner analogous to that described immediately hereinabove, ECH is blocked to poly(butadiene)diol forming an ABA type block copolymer wherein the chosen mol wt of the PBD segment ranges from about 500 to about 5000, and the mol wt of each ECH segment formed in the block copolymer ranges from about 350 to about 15000.

B. In a particular illustration, 250 g of OH-terminated PBD (Arco poly bd R-45) and 100 g of ECH were polymerized with 0.4 g of TEOP in 5 ml CH$_2$Cl$_2$, at 30° C. overnight to give a block copolymer having a mol wt of about 3500. The structure maybe written [(PECH, 500)-b-(PBD, 2500)-b-(PECH, 500)].

C. In an analogous manner, with the same PBD (250 g) and 740 g of ECH, the block copolymer obtained was [(PECH, 3700)-b-(PBD, 2500)-b-(PECH, 3700)].

D. Amination of [PECH-b-PBD-b-PECH].

400 g of the block copolymer formed in example V(C) hereinabove were dissolved in 400 g acetone and 800 ml water added. To this mixture was added 196 g of trimethylamine, along with about 4 g of an antioxidant, and the reaction carried out at 100° C. for 8 hr. The aminated block copolymer recovered was found to have about 15.58% Cl and 73% had been aminated.

E. Preparation of block copolymer [(PECH)-(PBD)].

In a manner analogous to that described immediately hereinabove, ECH is blocked to 1-hydroxy-polybutadiene forming an AB type block copolymer wherein the chosen mol wt of the PBD segment ranges from about 500 to about 5000, and the mol wt of each ECH segment formed in the block copolymer ranges from about 350 to about 15000.

EXAMPLE VI

HTP is OH-terminated copolymer of butadiene and styrene (BD-co-S):

A. Preparation of block copolymer [(PECH)-(BD-co-S)-(PECH)].

In a manner analogous to that described immediately hereinabove, ECH is blocked to a hydroxy-terminated copolymer of butadiene and styrene forming an ABA type block copolymer wherein the mol wt of the PBD-costyrene segment ranges from about 500 to about 5000, and the mol wt of each ECH segment ranges from about 350 to about 15000.

B. In a manner analogous to that described immediately hereinabove, a block copolymer of a OH-terminated copolymer of isoprenes and styrene is polymerized with ECH to give [(PECH)-b-(I-co-S)-b-(PECH)].

EXAMPLE VII

HTP is an OH-terminated polyalkane:

A. Preparation of [(CH$_3$—(CH$_2$)$_a$—b—(PECH)].

27 g of Aldol 85NF, a mono-hydroxyl-terminated polyalkane (mol wt 150-500) from Sherex Chemical containing a preponderance of C$_{18}$ molecules, some of which contain ethylenic unsaturation, is polymerized with 100 g of ECH using 0.1 g TEOP in CH$_2$Cl$_2$, in a manner analogous to that described hereinabove. The OH No. for the block copolymer formed was found to be 47; the calculated OH No. is 50. The mol wt of the block copolymer is about 1200.

In a manner analogous to that described immediately hereinabove, Aldol 61NF, also obtained from Sherex, and containing essentially no unsaturation, thus being a nearly pure polyalkane, is polymerized with ECH to form a block copolymer.

EXAMPLE VIII

HTP is tri-hydroxyl-terminated.

A prepolymer having 3 terminal OH groups is prepared according to the teachings of the Dreyfuss U.S. Pat. No. 3,850,856 patent, substituting glycerol for the ethylene glycol, as follows:

138.7 g of ECH and 9.2 g of glycerol are polymerized using 0.1 g TEOP in CH$_2$Cl$_2$, at 30° C. to obtain a prepolymer having a mol wt of about 1500, with essentially complete conversion of the ECH.

Using this prepared prepolymer as the HTP, 171 g of allylglycidyl ether (AGE) is blocked to the HTP using 0.3 g of TEOP, in a manner analogous to that described hereinabove. The block copolymer obtained had a mol wt of about 3200 and the structure:

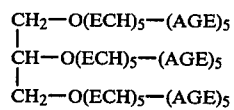

EXAMPLE IX

HTP is tetra-hydroxyl-terminated.

A prepolymer having 4 terminal OH groups is prepared by taking 15.6 g of Epon 828 diepoxide, with 6.2 g of ethylene glycol and 92.5 g of ECH all of which were charged to a flask fitted with a stirrer, thermometer and rubber septum. To this mixture was added 0.05 g TEOP in 5 ml of CH$_2$Cl$_2$ with a hypodermic syringe at 30° C. The reaction was carried out for 7 hr at 30° C. and reaches 100% conversion. This prepolymer has a OH No. of 91.0 (the theoretical OH No. is 96).

A tetra-hydroxyl terminated prepolymer may also be prepared using diepoxyloctane instead of Epon 828 diepoxide.

To the tetra-hydroxyl terminated prepolymer prepared above was added 114 g of allylglycidyl ether (AGE) and the polymerization carried out overnight at 30° C. using 0.17 g of TEOP in 5 ml of CH$_2$Cl$_2$, and results in a block copolymer having four branches (polymer chains).

From the foregoing examples it will now be evident that the hydroxyl-terminated prepolymer may be chosen from a wide range of prepolymers with aliphatic OH terminal groups which serve as propagating sites. Thus, a monomer used to form the segment A may also be used to provide the HTP in another block copolymer, but the segment A and the HTP in any block copolymer of this invention will always be different. The process of this invention may also be used to block one alkylglycidyl ether onto an HTP formed from another alkyl glycidyl ether, or alkenyl glycidyl ether, particularly if one of the segments contains halogen.

I claim:

1. A block copolymer of a hydroxyl-terminated prepolymer (HTP) and an oxirane monomer, said block copolymer having the structure

  (III)

wherein,

R$^1$ represents the residue of said HTP which originally contains from 1 to about 4 terminal aliphatic hydroxyl groups;

A represents the residue of a single ring-openable oxirane monomer selected from the group consisting of (i) an aliphatic or aromatic glycidyl ether having the structure

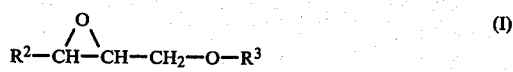  (I)

wherein R$^2$ and R$^3$ is each independently selected from the group consisting of hydrogen, alkyl having from 1 to about 40 carbon atoms, haloalkyl, alkenyl having from 2 to about 40 carbon atoms, haloalkenyl, alkoxyalkyl having from 1 to about 40 carbon atoms, aryl (Ar) or substituted aryl (Ar-Q), wherein Q is selected from the group consisting of alkyl, haloalkyl each having from 1 to about 10 carbon atoms, alkenyl and haloalkenyl each having from 2 to about 10 carbon atoms; and, (ii) a haloalkyl epoxide having the structure

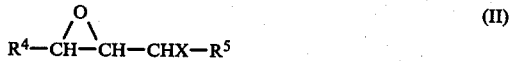  (II)

wherein

X is halogen atom and R$^4$ and R$^5$ is each independently selected from the group consisting of hydrogen and alkyl having from 1 to about 4 carbon atoms;

so that the molecular weight of the resulting block copolymer is directly proportional to the amount of monomer converted; and, a represents an integer in the range from about 5 to about 100;

b represents an integer in the range from 1 to about 4; so that the molecular weight of each of the segments of the copolymer is in the range from about 500 to about 10,000, and the molecular weight of the block copolymer is in the range from about 500 to about 500,000.

2. The block copolyer of claim 1 wherein said HTP is a mono-, di-, tri-, or tetra-hydroxyl terminated prepolymer having a molecular weight in the range of from 500 to about 15,000, and said R$^1$ is the residue of said prepolymer which is selected from the group consisting of a poly(alkylene ether) having at least 4 carbon atoms in a repeating unit, a polyalkadiene in which the repeating unit has from 4 to about 5 carbon atoms, a polyalkane, and a copolymer of said alkadiene with a vinyl aromatic monomer having from 8 to about 10 carbon atoms.

3. The block copolymer of claim 2 wherein said HTP is selected from the group consisting of mono-, and di-hydroxyl terminated (i) poly(butadienes) and poly(pentadienes) having a mol wt in the range from about 500 to about 15,000; (ii) poly(tetramethylene ether) and poly(pentamethylene ether) having a mol wt in the range from about 500 to about 10,000; (iii) polyalkane having a mol wt in the range from about 140 to about 700; (iv) poly(glycidyl ether) having the structure (I) with a mol wt in the range from about 500 to about 12,000 wherein the repeating unit is selected from the group consisting of an alkyl glycidyl ether having from 4 to about 12 carbon atoms; an aryl or aralkyl glycidyl ether having from 9 to about 20 carbon atoms; alkenyl or substituted alkenyl glycidyl ether having from 5 to about 12 carbon atoms; and (v) poly(haloalkylene ether) having the structure (II) with a molecular weight in the range of from about 500 to about 10,000 wherein the repeating unit has from 3 to about 8 carbon atoms.

4. The block copolymer of claim 3 wherein said alkyl glycidyl ether is selected from the group consisting of methyl glycidyl ether, propyl glycidyl ether and butyl glycidyl ether; said aryl glycidyl ether is phenyl glycidyl ether; said alkenyl glycidyl ether is selected from the group consisting of vinyl glycidyl ether, allyl glycidyl ether, butenylglycidyl ether, 4-vinylcyclcohexyl glycidyl ether, cyclohexenylmethyl glycidyl ether, and o-allyl-phenyl glycidyl ether; and said poly(haloalkylene ether) is selected from the group consisting of 1-chloro-2,3-epoxypropane(epichlorohydrin), 1-bromo-2,3-epoxypropane(epibromohydrin), 1-chloro-2,3-epoxybutane, 1-iodo-2,3-epoxyhexane, 3-chloro-4,5-epoxyoctane, 1-chloro-2,3-epoxycyclohexane; 1-bromo-2,3-epoxy-3-methylbutane; and, 2-chloro-2-methyl-3,4-epoxypentane.

5. The block copolymer of claim 4 wherein said HTP is selected from the group consisting of mono-, and di-hydroxyl-terminated poly(butadienes), poly(tetramethylene ether), poly(allyl glycidyl ether), poly(phenyl glycidyl ether), poly(isoprenes-co-styrene), and poly(butadines-co-styrene).

6. The block copolymer of claim 1 wherein segment A, and, optionally, R$^1$, contains a reactive halogen capable of an addition reaction with an amine to yield an aminated block copolymer.

7. The block copolymer of claim 6 wherein said aminated block copolymer is an amphiphilic block copolymer having the structure

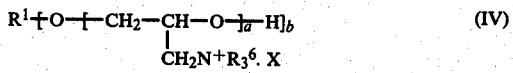  (IV)

wherein

X represents a halogen, and

R$_3^6$ is the residue of an amine selected from the group consisting of an alkylamine, dialkylamine, trialkylamine, cyclic alkylamine, fatty amine, polymeric amine, aromatic amine, polyetheramine, alkanolamine, thiazine, morpholine and a silane-containing amine.

8. The aminated block copolymer of claim 7 wherein A is epichlorohydrin, and said amine is a lower alkylamine having from 1 to about 6 carbon atoms.

9. The amphiphilic block copolymer of claim 7 wherein at least 20 percent of all reactive halogens are aminated.

10. The amphiphilic block copolymer of claim 7 wherein segment A is selected from the group consisting of allyl glycidyl ether, phenyl glycidyl ether and a lower alkyl glycidyl ether having from 1 to about 6 carbon atoms.

11. A process for the manufacture of a block copolymer having the structure (III) of a hydroxyl-terminated prepolymer (HTP) and an oxirane monomer, which process comprises, (i) polymerizing, a HTP with a single oxirane monomer selected from the group consisting of an acyclic glycidyl ether, a cyclic glycidyl ether, and a haloalkyl epoxide, in the presence of at least 0.001 part per 100 parts by weight of oxirane reactants of a catalyst selected from the group consisting of an $HMF_6$ acid, and, an oxonium salt of the $HMF_6$ acid, wherein M is an element selected from the group consisting of phosphorus, arsenic and antimony, at a temperature in the range from about 0° C. to about 100° C., and, (ii) recovering said block copolymer which is formed in an amount directly proportional to the conversion of monomer.

12. The process of claim 11 wherein said HTP is a mono-, di-, tri, or tetra-hydroxyl-terminated prepolymer having a molecular weight in the range of from about 200 to about 15,000, and said prepolymer is selected from the group consisting of a poly(alkylene ether) having at least 4 carbon atoms in a repeating unit, a poly(alkadienes) in which the repeating unit has from 4 to about 5 carbon atoms, and a copolymer of said alkadiene with a vinyl aromatic monomer having from 8 to about 10 carbon atoms.

13. The process of claim 12 wherein said block copolymer is selected from the group consisting of mono-, and di-hydroxyl-terminated (i) poly(butadienes) and poly(pentadienes) having a mol wt in the range from about 500 to about 15,000; (ii) poly(tetramethylene ether) and poly(pentamethylene ether) having a mol wt in the range from about 500 to about 10,000; (iii) polyalkane having a mol wt in the range from about 140 to about 700; (iv) poly(glycidyl ether) having the structure (I) with a mol wt in the range from about 500 to about 12,000 wherein the repeating unit is selected from the group consisting of an alkyl glycidyl ether having from 4 to about 12 carbon atoms, an aryl or aralkyl glycidyl ether having from 9 to about 20 carbon atoms, alkenyl or substituted alkenyl glycidyl ether having from 5 to about 12 carbon atoms; and, (v) a poly(haloalkylene ether) having the structure (II) with a mol wt in the range of from about 500 to about 10,000 wherein the repeating unit has from 3 to about 8 carbon atoms.

14. The process of claim 13 wherein (a) said alkyl glycidyl ether is selected from the group consisting of methyl glycidyl ether, propyl glycidyl ether; (b) said aryl glycidyl ether is phenyl glycidyl ether; (c) said alkenyl glycidyl ether is selected from the group consisting of vinyl glycidyl ether, allyl glycidyl ether, butenylglycidyl ether, 4-vinylcyclohexyl glycidyl ether, cyclohexenylmethyl glycidyl ether, and o-allyl-phenyl glycidyl ether; and, (d) said poly(haloalkylene ether) is selected from the group consisting of 1-chloro-2,3-epoxypropane(epichlorohydrin), 1-bromo-2,3-epoxypropane(epibromohydrin), 1-chloro-2,3-epoxybutane, 1-iodo-2,3-epoxyhexane, 3-chloro-4,5-epoxyoctane, 1-chloro-2,3-epoxycyclohexane, 1-bromo-2,3-epoxy-3-methylbutane, and, 2-chloro-2-methyl-3,4-epoxypentane.

15. The process of claim 14 wherein said HTP is selected from the group consisting of mono-, and di-hydroxyl-terminated poly(butadienes), poly(tetramethylene ether), poly(allyl glycidyl ether), poly(butyl glycidyl ether), poly(phenyl glycidyl ether) and poly(butadienes-co-styrene).

16. The process of claim 11 wherein segment A of said block copolymer contains a reactive halogen capable of an addition reaction with an amine, and, optionally, $R^1$ of said block copolymer contains a reactive halogen capable of an addition reaction with an amine, so as to have formed a halogen-containing block copolymer, said process including, in addition, contacting said halogen-containing block copolymer with a preselected amount of an amine sufficient to aminate a preselected amount of said reactive halogen, optionally in the presence of a solvent for said amine and said halogen-containing block copolymer, at a temperature in the range from about 40° C. to about 110° C., and a pressure in the range from about 50 to about 500 psig.

17. The process of claim 16 wherein said halogen-containing block copolymer includes a segment aminated with an amine selected from the group consisting of an alkylamine, dialkylamine, trialkylamine, cyclic alkylamine, fatty amine, polymeric amine, aromatic amine, polyetheramine, alkanolamine, thiazine, morpholine and a silane-containing amine.

18. The process of claim 17 wherein said halogen-containing block copolymer includes a segment aminated with an amine which is a lower alkylamine having from 1 to about 6 carbon atoms.

* * * * *

UNITED STATES PATENT AND TRADEMARK OFFICE
CERTIFICATE OF CORRECTION

PATENT NO. : 4,451,618
DATED : May 29, 1984
INVENTOR(S) : YOSHIHISA OKAMOTO

It is certified that error appears in the above-identified patent and that said Letters Patent are hereby corrected as shown below:

Claim 2, column 18, lines 1 and 2 "from 500 to about 15,000" should read -- from about 500 to about 15,000--.

Signed and Sealed this

Sixth Day of August 1985

[SEAL]

Attest:

DONALD J. QUIGG

Attesting Officer

Acting Commissioner of Patents and Trademarks